United States Patent [19]

McArthur

[11] 3,983,052

[45] Sept. 28, 1976

[54] PROCESS FOR REJUVENATING AUTOMOBILE EMISSION CONTROL CATALYSTS

[75] Inventor: Dennis P. McArthur, Yorba Linda, Calif.

[73] Assignee: Union Oil Company of California, Los Angeles, Calif.

[22] Filed: Apr. 7, 1975

[21] Appl. No.: 565,633

[52] U.S. Cl. .............................................. 252/412
[51] Int. Cl.² ....................................... B01D 15/06
[58] Field of Search ................................... 252/412

[56] References Cited
UNITED STATES PATENTS

| | | | |
|---|---|---|---|
| 2,867,497 | 1/1959 | Houdry et al. | 423/214 |
| 3,108,972 | 10/1963 | Retailliau | 252/412 |
| 3,112,277 | 11/1963 | Michalko | 423/213.2 |
| 3,168,481 | 2/1965 | Erickson | 252/412 |

*Primary Examiner*—Patrick P. Garvin
*Assistant Examiner*—John P. Sheehan
*Attorney, Agent, or Firm*—Richard C. Hartman; Lannas S. Henderson; Gregory F. Wirzbicki

[57] ABSTRACT

A method for the rejuvenation of an automobile emission control catalyst poisoned with compounds of lead and/or phosphorus comprising (a) initially extracting lead sulfate deposits from the catalyst with an aqueous ammonium salt (preferably ammonium acetate) solution; (b) exposing the catalyst to an atmosphere containing $SO_2$, or $SO_2$ and air, at 300° to 700°C. until other lead compounds are substantially converted to lead sulfate, and phosphorus compounds are substantially converted to gaseous $P_2O_5$; and finally (c) removing at least a portion of the lead sulfate formed in (b) by a second extraction with an aqueous ammonium salt solution.

Catalysts contemplated for rejuvenation by the process of the invention include those comprising nickel, palladium, rhodium, platinum, or combinations thereof as active components on bases of alumina or aluminum borate.

24 Claims, No Drawings

PROCESS FOR REJUVENATING AUTOMOBILE EMISSION CONTROL CATALYSTS

BACKGROUND AND BRIEF SUMMARY OF THE INVENTION

This invention relates to the rejuvenation or reactivation of deactivated automobile emission control catalysts. More particularly, it relates to the rejuvenation of such catalysts by at least a partial removal of lead, sulfur and phosphorus compounds from the surfaces thereof, and by increasing the surface area of the active metal or metals contained therein.

Much research has been conducted to discover a method to reduce the air pollutants in the exhaust gas of automobile engines. At the present time it is thought that the most feasible method involves, or will involve, the utilization of some form of catalytic converter. This device generally operates in two stages, the first to reduce $NO_x$ compounds to nitrogen, and the second to oxidize CO and hydrocarbons.

Several combinations of catalysts are known in the art which can achieve the desired activity and selectivity for $NO_x$ conversion in the first stage and for the oxidation of CO and hydrocarbon gases in the second. Despite their relatively high cost, preferred catalysts comprise rhodium, with or without added nickel, on bases of alumina or aluminum borate for the $NO_x$ reduction stage, and platinum and/or palladium on similar bases for the CO/hydrocarbon oxidation catalyst. When exposed to exhaust gases containing even very minor amounts of compounds of lead and/or phosphorus these catalysts eventually become deactivated due to contaminant poisoning. Thus usually occurs after about 20,000 miles of engine operation, or sooner if the engine is not operated exclusively on Federally Certified gasoline (less than 0.05 g Pb and less than 0.005 g P per gallon).

Research into the nature of the contaminant poisons reveals that the chemical compounds responsible for catalyst deactivation are derived from the compounds of Pb, P and S present in the gasoline, P, S, Zn Ca, Mg and Ba present in motor oil and Fe, Cu, Cr and Ni present in the metals composing the engine. The catalytic poisons other than compounds of P, S and Pb generally deactivate the catalysts only when present in large amounts, the primary mechanism of their deactivation being inhibition of diffusion of the exhaust gases to the catalyst surface and shielding of the active catalyst sites. Lead, sulfur and phosphorus, which deposit mainly as the compounds, $PbO$, $PbO_2$, $nPbO.PbCl_2$, $nPbO.PbBr_2$, $3Pb_3(PO_4)_2.PbCl_2$ (or $Br_2$), $PbO.Pb_3(PO_4)_2$, $PbSO_4$, $PbCl_2$, $PbBr_2$ $nPbO.PbSO_4$ and $Pb_3(PO_4)_2$ are known rapidly to deactivate the noble metal catalysts when as little as 0.5 to 8 percent by weight, determined as elemental P and/or Pb, of such compounds deposit thereon. A major problem confronting industry lies in developing effective and economical methods for rejuvenating such poisoned catalysts. To date, no such method has been developed.

It has now been found that the contaminant poisons previously discussed, especially lead sulfate, can be removed from $NO_x$ reduction and CO/hydrocarbon oxidation catalysts, and the same effectively regenerated thereby, by the three-step process of subjecting such catalysts to: (1) extraction with a concentrated aqueous solution of ammonium salt, (2) sulfation in an atmosphere containing $SO_2$ or $SO_2$ and oxygen, and (3) extraction once again with an aqueous ammonium salt solution. The purpose of the first extraction step is mainly to dissolve out lead sulfate; that of the sulfation step is to convert the other lead compounds into lead sulfate so that they may be dissolved in like manner in the second extraction step. Phosphorus is partially removed in the sulfation step by volatilization to gaseous $P_2O_5$. Other contaminant poisons such as Fe, Zn, Mg, etc., are also found to be removable by the process of the invention. Catalytic rejuvenation in the manner described herein recovers between 50 and 75 percent or more of the original fresh activity lost by contaminant poisoning.

A somewhat puzzling aspect of the invention is that the proportion of lead and phosphorus compounds removed from the catalysts by identical rejuvenation treatments varies greatly from catalyst to catalyst. However, even in cases where as little as 2–10% of the lead and 5–20% of the phosphorus are removed, there is still a substantial rejuvenation in activity. It would hence appear that (1) only a small proportion of the total lead and phosphorus deposits on the catalysts are associated with the active metal or metals in a deactivating relationship, the remainder being distributed in relatively harmless locations, and (2) the small deactivating proportions are fortunately the most readily removable by the rejuvenation treatment. It is also possible that in some cases the rejuvenation treatment may bring about a desirable redispersion of agglomerated active metals.

DETAILED DESCRIPTION OF THE INVENTION

This invention is designed to rejuvenate automobile emission control catalysts which have been deactivated by the deposition of compounds of lead, phosphorus, sulfur and other poisons on their surfaces. It is not designed to rejuvenate catalysts when the primary reason for their loss of activity is thermal degradation or loss by volatilization of the active metal components.

It is generally known in the art that lead sulfate is one of the primary deactivants for most automobile emission control catalysts, whether they contain noble metal or base metal active components. Lead sulfate may comprise from about 1% to about 60% by weight of the total deposited lead compounds; the remainder will be in various forms or combinations of $PbO$, $PbO_2$, $Pb_3(PO_4)_2$, $PbCl_2$ and $PbBr_2$. When the total lead compounds are present in quantities as little as 2 to 8 percent (as Pb) of catalyst weight, they can be primarily responsible for most of the overall deactivation. Therefore, in the rejuvenation technique of the invention primary emphasis is directed to the removal of lead sulfate, and secondary importance is assigned to the dissolution of what can be termed the secondary lead and phosphorus deactivants, $PbO$, $Pb_3(PO_4)_2$, etc.

The catalysts which can be rejuvenated by the process of this invention include those presently utilized either for $NO_x$ reduction or CO/hydrocarbon oxidation. More definitively, the invention contemplates regeneration of supported catalysts containing one or more Group VIII metals, alone or with other transitional metals of the Periodic Table. The support can be any of those well known to the art which comprise a major proportion of porous, thermally stable material. Included herein are such refractory oxide supports as carborundum, alpha alumina, delta alumina, gamma alumina, zirconia, mullite, cordierite, aluminum phosphate, aluminum borate, etc. Crystalline aluminum borates of the type described in my U.S. Pat. No. 3,856,705 are especially preferred. Such support materials can be made by any conventional method and can be shaped into suitable granular or honeycombed monolithic forms by pelleting, extruding, prilling or the like.

Catalysts especially contemplated for CO/hydrocarbon oxidation are those containing Pd-Pt or Pt-Rh on a cordierite ceramic substrate which has been pre-coated with a stabilized alumina or aluminum borate wash coating. One especially preferred for $NO_x$ reduction comprises Ni-Rh on an aluminum borate coated cordierite monolithic substrate.

In the first step of the invention an aqueous ammonium salt solution is utilized, primarily to dissolve lead sulfate. Any one or more soluble ammonium salt or salts can be used for this purpose. Suitable salts include ammonium nitrate, ammonium chloride, ammonium sulfate or the like. In general, however, it is preferred to utilize salts such as ammonium acetate, ammonium citrate, ammonium carbonate, etc., which, even in concentrated aqueous solution are substantially neutral or slightly basic, yielding pH's between about 6 and 9.6. These salts are relatively nontoxic, noncorrosive and nonflammable; as a result, they can be safely used with no special industrial equipment being necessary for their handling. Ammonium acetate is a remarkably efficient solvent for lead sulfate. For these reasons, it is by far the preferred ammonium salt.

The method by which a deactivated catalyst is contacted with the aqueous ammonium salt solution is not critical, and may depend upon the resources available. Simple soaking is the most obvious and cheapest method, especially if the catalyst is easily separated from its container. However, this technique suffers from the fact that dissolved lead compounds may concentrate near the catalyst surface, thus inducing localized saturation which impedes the dissolution of remaining undissolved lead compounds. In the preferred method of operation, therefore, advantage is taken of the fact that agitation by means of a recycle pump continuously removes dissolved lead compounds from the vicinity of the catalyst, thus eliminating the problems associated with localized saturation. Recycling of the aqueous ammonium salt solution by means of a suitable pumping arrangement also has the advantage of being the method most practical for regenerating the catalysts in situ - that is, without having to remove them from either the automobile or their encapsulating container.

The aqueous ammonium salt solutions can be employed in concentrations ranging from extremely dilute, e.g. 0.1M, to saturated, and in the temperature range from ambient to boiling (20°-115°C). Preferably however, concentrations of such salt solutions range between about 2 and 10 M, and temperatures near or at the boiling point, preferably between about 70° and 115°C, are utilized. Despite the severity of such treatment damage to the catalysts is minimal. Thus, although it is within the scope of the invention to perform the extraction with a cold dilute solution of ammonium salt, better results are achieved with boiling, highly concentrated solutions.

The time during which the catalyst is contacted with the aqueous ammonium salt solution can range from about 10 minutes to 3 to 4 days. It has been discovered, however, that little advantage is realized by prolonging the contacting beyond about 3 hours at temperatures of 90°-115°F. This is especially true when concentrated solutions are used. The preferred mode of operation involves immersion or recycling in the aqueous ammonium salt solution for about 1-5 hours.

After a thorough rinsing of the catalyst, preferably with distilled or deionized water, followed by drying, it is found that substantial removal of contaminant metals and restoration of catalytic activity are effected, as will be demonstrated in Examples II and III hereinafter. However, in order to remove more contaminants and recover even more activity, it is preferred to subject the extracted catalyst to a sulfation treatment which converts remaining lead compounds to lead sulfate. It also converts other contaminants to more readily extractable forms, or to gases (such as $P_2O_5$) which are discharged with the sulfating gas.

As broadly conceived, this sulfation treatment contemplates subjecting the catalyst to an atmosphere containing (in addition to inert gases) $SO_2$ as the essential active component, or a mixture of $SO_2$ and a free oxygen-containing gas at elevated temperatures between about 200° and 800°C, preferably between about 300° and 700°C, for a time period between about 10 minutes and 3 to 4 days, but preferably for about 1-5 hours. This treatment can be accomplished in several ways. For instance, in the preferred manner the catalyst can simply be enclosed in an appropriate pressure vessel (e.g., its original container) into which the $SO_2$ or the mixture of $SO_2$ and air is added, and heated to 300° to 700°C under autogeneous pressure. Alternatively, the sulfating gas can be heated by external means, then passed over the catalyst and finally discharged to the atmosphere or, in the alternative, recycled back over the catalyst again.

When a mixture of $SO_2$ and air is utilized (rather than $SO_2$ alone), the concentrations of $SO_2$ and oxygen in the sulfating atmosphere are optional, being dependent mainly upon the rapidity with which it is desired to complete the sulfation. Lightly contaminated catalysts can be fairly rapidly sulfated in an atmosphere containing $SO_2$ and $O_2$ in concentrations of no more than about 100 ppm each. Reactions which are believed to occur during the sulfation step include the following:

$$4PbO + 4SO_2 + 2O_2 \rightarrow 4PbSO_4 \tag{V}$$

$$4PbO + 4SO_2 \rightarrow 3PbSO_4 + PbS \tag{VI}$$

However, it is probable that not all of the sulfation reactions go to completion, and it is hence not essential that stoichiometric proportions of the sulfating gases be reacted with the catalyst poisons. Sulfation may be regarded as complete when there is no further weight change in the catalyst over a 30 minute period of sulfation, although it is not essential that such completion be reached. Useful results are obtained from the combination of the catalyst poisons with as little as 0.1 weight-percent of $SO_2$, based on total lead content.

Of course, as those skilled in the art will realize, when only the minimum theoretical amounts of $SO_2$ and oxygen are utilized, the time period necessary for adequate sulfation in a pressurized reactor may be undesirably long. Therefore, it is preferred that excess $SO_2$ and air be utilized, e.g. at least twice the respective stoichiometric amounts. When the catalyst is to be treated by continuous passage of the sulfating gas over the catalyst, it is especially desirable to utilize more than the theoretical amounts of sulfating gases. This is due to the kinetics of the various reactions involved, coupled with the velocity of the gas stream. Therefore, it is preferred that some multiple between about 2 and 100 times the theoretically required amounts of sulfating gases be utilized at preferred space velocities of $SO_2$ and oxygen between about 3 and 12 GHSV and 1.5 and 6 GHSV, respectively.

In those instances wherein there is a danger of sulfating the refractory oxide support as well as the poison compounds, it may be advantageous to sulfate only with $SO_2$. For instance, it is known that some alumina supports can be sulfated and thus destroyed by $SO_3$. Therefore, when there is a possibility that an atmosphere containing both $SO_2$ and $O_2$ at elevated temperatures will be converted by the catalyst to $SO_3$, it is generally more desirable to utilize only $SO_2$ in treating alumina-supported catalysts. As will be shown in the examples, sulfating with only $SO_2$ is effective for recovering lost catalytic activity, but is not as effective for removing contaminants when both $SO_2$ and oxygen are used.

After sulfation of the catalyst by any of the aforementioned means or their obvious equivalents has been accomplished, the catalyst is subjected to a second aqueous ammonium salt solution extraction as previously described to remove lead sulfate and other compounds formed during the sulfation process. At the conclusion of the second extraction, the catalyst is freed of a sufficient amount of compounds of lead, sulfur and phosphorus so that a substantial portion of its lost activity is regained. Significant amounts of iron, magnesium, calcium, etc. are also removed, although in some cases the exact mechanism for their removal is not clearly understood.

While the invention basically contemplates the three-step process outlined thus far, the technique of sulfation followed by aqueous ammonium salt solution extraction can be repeated any number of times, with each cycle improving the activity of the catalyst. It is also within the contemplated scope of the invention to eliminate the first aqueous ammonium salt solution extraction and relay exclusively on the sulfation step followed by an aqueous ammonium salt solution extraction, or series of such sulfation-extraction cycles. Excellent results have been so obtained.

The following examples are presented to illustrate the invention, but are not to be construed as limiting in scope. It should be noted that the synthetic exhaust gas specified in Examples II, IV, V and VI had the following volume-percent composition: 0.08 NO; 2.0 CO; 0.1 Hydrocarbons; 12.0 $CO_2$; 10 $H_2O$; 0.35 $O_2$; 0.33 $H_2$; 0.0045 $SO_2$ and $N_2$ balance. The gaseous hourly space velocity was 103,000 $h^{-1}$ unless otherwise specified.

EXAMPLE I

Four similar CO/hydrocarbon oxidation catalysts containing active dual components of Pt and Rh on a stabilized alumina-coated cordierite monolith support were known to be seriously deactivated by automobile exhaust during vehicle testing. Sample cores from each catalyst were removed and subjected to the following treatments in series: (a) immersion in concentrated ammonium acetate solution (750 g./l.) at 100°C for 2 hours; (b) washing, draining and drying, and (c) sulfation at 500°–525°C for 1 to 2 hours in a flowing gas stream (220 GHSV) consisting of 72.5% $SO_2$, 21.7% $N_2$ and 5.8% $O_2$; and (d) immersion in ammonium acetate as in step (a). Steps (b), (c) and (d) were then repeated for an additional 3 cycles. The treated catalysts were then activity tested, utilizing a standard test for measuring activity for oxidation of auto exhaust hydrocarbons and CO, with the following results:

TABLE I

| | Catalyst No. | | | |
|---|---|---|---|---|
| | 1167 | 1168 | 1174 | 1175 |
| *$T_{50}$ Hydrocarbon Oxidation Temperature, °F of: | | | | |
| (a) Fresh Catalyst | 530 | 530 | 530 | 530 |
| (b) Deactivated Catalyst | 739 | 669 | 856 | 835 |
| (c) Rejuvenated Catalyst | 550 | 569 | 686 | 630 |
| Net Change (b) − (c) | 180 | 100 | 170 | 205 |
| *$T_{50}$ CO Oxidation Temperature (°F) of: | | | | |
| (a) Fresh Catalyst | 497 | 497 | 497 | 497 |
| (b) Deactivated Catalyst | 689 | 621 | 826 | 758 |
| (c) Rejuvenated Catalyst | 558 | 569 | 690 | 632 |
| Net Change, (b) − (c) | 78 | 52 | 136 | 126 |
| Lead Content (as wt. % of Catalyst) | | | | |
| (a) Deactivated Catalyst | 7.39 | 2.42 | 6.11 | 3.17 |
| (b) Rejuvenated Catalyst | 3.77 | 1.33 | 6.03[a] | 2.75 |
| Net change, (a) − (b) | 3.62 | 1.09 | .08 | .42 |
| % Removal | 49 | 45 | 1.3[a] | 13 |
| Phosphorus Content (As Wt. % of Catalyst) | | | | |
| (a) Deactivated Catalyst | .27 | .07 | .44 | .08 |
| (b) Rejuvenated Catalyst | .11 | .04 | .41 | .06 |
| Net Change, (a) − (b) | .16 | .03 | .03 | .02 |
| % Removal | 59 | 43 | 7 | 25 |
| Sulfur Content (As Wt. % of Catalyst) | | | | |
| (a) Deactivated Catalyst | .12 | .21 | 0 | 0 |
| (b) Rejuvenated Catalyst | .02 | .18 | — | — |
| Net Change, (a) − (b) | .10 | .03 | — | — |
| % Removal | 83 | 14 | — | — |

*$T_{50}$ is the temperature at which 50% of the carbon monoxide or hydrocarbons are oxidized.
[a]Probable analytical error; analyses of the aqueous extracts from the rejuvenation treatment indicated about 9% Pb removal.

These results show in all cases a substantial recovery of hydrocarbon and CO oxidation activity. It should be noted that the activity of the catalysts as measured by the $T_{50}$ temperatures never equals the activity of the fresh catalysts; however this is not unexpected. A substantial portion of lost activity was undoubtedly attributable to irreversible thermal deactivation.

EXAMPLE II

The catalyst employed in this Example was prepared by first applying an aluminum borate wash coat to an American Lava Cordierite Monolith, Al Si Mag 795 of the rolled corrugated type 12/8, substantially as described in Example 19 of my above noted Pat. No. 3,856,705, and then impregnating the coated monolith with about 0.05% Rh and 5% NiO. This catalyst was tested for $NO_x$ conversion activity on an engine dynamometer for the equivalent of 12,000 miles. The mode of engine operation was such that the exhaust gas was constantly net reducing. The catalyst operating temperature was in the range of 1050°–1100°F. Certification fuel and ashless oil were used. As a result of dynamometer aging, the catalyst was severely deactivated, gross $NO_x$ conversion at 1100°F having decreased from 75% to 30%.

The deactivated catalyst was then subjected to a solvent extraction treatment by immersion for one hour in boiling 6 M ammonium acetate solution, then washed and dried. The performance of the catalyst following this first rejuvenation treatment is shown in Table 2. The catalyst was next subjected to sulfation in a "flow reactor" at ~525°C through which was passed a gas stream consisting of 50% $SO_2$, 10.5% $O_2$ and 29.5% $N_2$. The total gas flow rate was 635 GHSV and the sulfating time was one hour. Following the sulfation step, the catalyst was boiled in a 6 M ammonium acetate solution for 2 hours, washed, dried and retested. This two-step sulfating-solvent extraction rejuvenation treatment was repeated twice more with intervening and final activity testing. The results were as follows:

TABLE II

| Catalyst Condition | 50% Gross $NO_x$ Conversion Temperature, °F |
|---|---|
| After 12,000 miles | >1500 |
| After Solvent Extraction | 628 |
| After 1st Sulfating-Solvent Extraction | 598 |
| After 2nd Sulfating-Solvent Extraction | 581 |
| After 3rd Sulfating-Solvent Extraction | 557 |
| Fresh | 496 |

Note: The performance of the catalyst following each treatment was evaluated by determining the gross $NO_x$ conversion of the synthetic exhaust gas at 138,000 GHSV.

EXAMPLE III

A commercial monolithic CO/hydrocarbon oxidation catalyst (Pd-Pt-$Al_2O_3$) was engine dynamometer tested for 400 hours (~25,000 miles) using certification fuel and fully formulated motor oil. As a result of dynamometer aging, the hydrocarbon conversion activity decreased ~78%. The decrease in CO conversion activity was insignificant.

The deactivated catalyst was first subjected to a solvent extraction treatment in which the catalyst sample was twice immersed in fresh 6 M ammonium acetate solutions at 90° - 100°C for 2 hours. After washing and drying, the catalyst was then sulfated for 2 hours at 550°C in a gas stream consisting of 64.9% $N_2$, 17.3% $O_2$ and 17.8% $SO_2$. The total gas flow rate was about 10.3 GHSV during this sulfation treatment. After subjecting the catalyst to a second 6 M ammonium acetate solvent extraction (90°-100°C), the catalyst was sulfated and solvent extracted twice more in the same manner except that the first such subsequent sulfation was at 650°C and the second at 700°C. Analysis of the extracts from the various extraction steps showed the following removal of contaminants:

TABLE III

| Rejuvenation Treatment | Contaminants Removed, g | | | |
|---|---|---|---|---|
| | Pb | P* | Zn | Fe |
| Solvent Extraction | 4.927 | 0.069 | 0.095 | 0.005 |
| Sulfating 550°C - Solvent Extraction | 4.571 | 0.434 | 0.290 | 0.729 |
| Sulfating 650°C - Solvent Extraction | 4.202 | 0.725 | 0.091 | 1.468 |
| Sulfating 700°C - Solvent Extraction | 2.611 | 0.320 | 0.049 | 0.404 |
| Total, grams | 16.311 | 1.548 | 0.525 | 2.606 |

*These figures do not reflect total phosphorus removal since the sulfation treatments removed some as $P_2O_5$.

EXAMPLE IV

A monolith $NO_x$ reducing catalyst substantially identical to that described in Example II (Rh-Ni) was engine dynamometer tested for the equivalent of 52,100 miles. The engine was run on certification gasoline and fully formulated oil. During 50% of the time the engine was operating, the conditions were net reducing and the maximum temperature range of the exhaust gas (catalyst inlet) was 1050° - 1150°F. During the remaining 50% of operating time, the conditions were alternately oxidizing and net reducing; the maximum temperature range of the exhaust gas (catalyst inlet) during this time was 1250° - 1350°F. The catalyst was severely degraded, not only because of the 52,100 mile run, but also because of operation under alternating net reducing and oxidizing conditions.

Four essentially equally poisoned core samples of the catalyst were removed and found to be deactivated by the following poisons: 0.14 wt.% Ca, 1.15 wt.% Pb, 1.67 wt.% P and 0.27 wt.% Zn. Three of the samples were rejuvenated by various treatments shown in Table IV. All four samples were then activity tested in a bench reactor through which was passed the synthetic exhaust gas. The performance of each sample and the rejuvenation treatments employed were as follows:

TABLE IV

| Catalyst Sample No. | Treatment | 30% $NO_x$ Gross Conversion Temp., °F |
|---|---|---|
| 1 | None | >1350 |
| 2 | Immersion in 750 g/l $NH_4Ac$ for 60 min. at 95°C. | 965 |
| 3 | 5% $SO_2$, 95% $N_2$ at 3800 GHSV for 90 min. at 560°C; then immersion in $NH_4Ac$ as Sample No. 2 | 705 |
| 4 | 5% $SO_2$, 20% $O_2$, 75% $N_2$ at 3800 GHSV for 4 hrs. at 650°C; then immersion in 750 g/l $NH_4Ac$ for 80 min. at 95°C | 675 |

This Example shows show three different embodiments of the invention (i.e., $NH_4Ac$ extraction, sulfating without added $O_2$ followed by $NH_4Ac$ extraction, and sulfating with added $O_2$ followed by $NH_4Ac$ extraction) effect considerable recovery of activity even on severely deactivated catalysts.

EXAMPLE V

A monolith $NO_x$ reducing catalyst substantially identical to that described in Example II (Rh-Ni) was engine dynamometer tested for the equivalent of 31,300 miles. The conditions were always net reducing and the maximum engine exhaust temperature (catalyst inlet) was 1100°F. Sterile fuel (i.e. no contaminant poisons) and fully formulated oil were used. This catalyst, because of the sterile fuel and constant net reducing conditions, was considered lightly deactivated.

Three essentially equally poisoned catalyst core samples were removed and found to be deactivated by the following poisons: 0.06 wt.% Ca, 0.46 wt.% P, 0.01 wt.% S and 0.07 wt.% Zn. Two of the samples were rejuvenated by treatments shown in Table V. All three samples were then activity tested in a bench reactor through which was passed the synthetic exhaust gas. The performance of each sample and the rejuvenation treatments employed were as follows:

TABLE V

| Catalyst Sample No. | Treatment | 50% Gross $NO_x$ Conversion Temp., °F |
|---|---|---|
| 1 | None | 625 |
| 2 | Immersion in $NH_4Ac$ (750 g/l) for 60 min. at 95°C | 615 |
| 3 | 5% $SO_2$, 95% $N_2$ for 90 min. at 560°C at 3800 GHSV; then $NH_4Ac$ immersion as in Sample No. 2 | 520 |

This example shows that the sulfation treatment improves activity of catalysts which have been poisoned essentially with phosphorus compounds. The sample treated only with ammonium acetate showed little improvement. This result was not unexpected in view of the fact that there were no lead poisons on the catalyst.

EXAMPLE VI

A monolith $NO_x$ reducing catalyst substantially identical to that described in Example II (Rh-Ni) was engine dynamometer tested for the equivalent of 11,600 miles. The conditions were always net reducing and the maximum engine exhaust temperature (catalyst inlet) was 1100°F. Certification fuel and sterile oil (i.e. containing no contaminant poisons) were used.

Five essentially equally poisoned catalyst core samples were removed and found to be deactivated by the following poisons: 0.09 wt.% Ca, 0.81 wt.% Pb, 0.03 wt.% S and 0.01 wt.% Zn. Four of the samples were rejuvenated by various treatments shown in Table VI. The five samples were then activity tested in a bench reactor through which was passed the synthetic exhaust gas. The performance of each sample and their rejuvenation treatments were as follows:

TABLE VI

| Catalyst Sample No. | Treatment | 50% Gross $NO_x$ Conversion Temp., °F |
|---|---|---|
| 1 | None | >1350 |
| 2 | Immersed in $NH_4Ac$ (750 g/l) for 60 min. at 95°C | 980 |
| 3 | 5% $SO_2$, 95% $N_2$ for 90 min. at 560°C at 3800 GHSV; then $NH_4Ac$ immersion as Sample No. 2 | 825 |
| 4 | 5% $SO_2$, 20% $O_2$, 75% $N_2$ for 90 min. at 560°C at 3800 GHSV; then $NH_4Ac$ immersion as Sample No. 2 except for 80 min. | 645 |
| 5 | 5% $SO_2$, 20% $O_2$, 75% $N_2$ for 4 hr. at 650°C at 3800 GHSV; then $NH_4Ac$ immersion as Sample No. 4 | 570 |

This example shows that sulfating with both $SO_2$ and oxygen gives best results. Also, the use of higher sulfating temperatures and longer sulfation times increases the amount of activity recovered.

The following claims and their obvious equivalents are believed to define the true scope of the invention.

We claim:

1. A process for the rejuvenation of an auto exhaust gas conversion catalyst comprising a Group VIII metal dispersed on a refractory oxide support, said catalyst having been previously utilized for the conversion of air pollutants in auto exhaust gases containing lead and phosphorus compounds with resultant deposition thereon of deactivating solids comprising lead and phosphorus compounds, which process comprises:

a. contacting said catalyst with an aqueous ammonium salt solution of at least about 0.1 M concentration at a temperature between about 20°C and the boiling temperature for at least about 10 minutes;

b. contacting the catalyst from step (a) with a sulfating gas for at least about 10 minutes at a temperature between about 200°C and about 800°C, said sulfating gas comprising sulfur dioxide as its essential active component;

c. contacting the sulfated catalyst from step (b) with an ammonium salt solution as defined in step (a) and under the same conditions as defined in step (a); and d. recovering said catalyst with at least some of said lead and phosphorus deactivating solids removed therefrom, said catalyst being recovered in a substantially more active condition.

2. A process for the rejuvenation of an auto exhaust gas conversion catalyst comprising a Group VIII metal dispersed on a refractory oxide support, said catalyst having been previously utilized for the conversion of air pollutants in auto exhaust gases containing lead and phosphorus compounds with resultant deposition thereon of deactivating solids comprising lead and phosphorus compounds, which process comprises:

a. contacting said catalyst with an aqueous ammonium salt solution of at least about 0.1 M concentration at a temperature between about 20°C and boiling for at least about 10 minutes, said ammonium salt being selected from the class consisting of ammonium chloride, ammonium nitrate, ammonium sulfate, ammonium acetate, ammonium citrate and ammonium carbonate;

b. contacting the catalyst from step (a) with a sulfating gas for at least about 10 minutes at a temperature between about 200°C and about 800°C, said sulfating gas comprising sulfur dioxide as its essential active component;

c. contacting the sulfated catalyst from step (b) with an aqueous ammonium salt solution as defined in step (a) and under the same conditions as defined in step (a); and d. recovering therefrom said catalyst with at least some of said lead and phosphorus deactivating solids removed, said catalyst being recovered in a substantially more active condition.

3. The process as defined in claim 2 wherein said contacting in steps (a) and (c) is carried out with an aqueous ammonium acetate solution at a temperature between about 70°C and boiling.

4. The process as defined in claim 3 wherein said contacting in step (b) is carried out at a temperature between about 300°C and about 700°C for at least about 1 hour.

5. The process as defined in claim 3 wherein said Group VIII metal is selected from the class consisting of nickel, platinum, palladium, rhodium and mixtures thereof.

6. The process as defined in claim 3 wherein said refractory oxide support is selected from the class consisting of carborundum, alpha alumina, gamma alumina, delta alumina, zirconia, mullite, cordierite, aluminum phosphate, aluminum borate and combinations thereof.

7. The process as defined in claim 2 wherein said sulfating gas also comprises free oxygen.

8. The process as defined in claim 7 wherein said contacting in steps (a) and (c) is carried out with an aqueous ammonium acetate solution at a temperature between about 70°C and boiling.

9. The process as defined in claim 8 wherein said contacting in step (b) is carried out at a temperature between about 300° and about 700°C for at least about 1 hour.

10. The process as defined in claim 8 wherein said Group VIII metal is selected from the class consisting of nickel, platinum, palladium, rhodium and mixtures thereof.

11. The process as defined in claim 10 wherein said Group VIII metal is rhodium.

12. The process as defined in claim 10 wherein said refractory oxide support is selected from the class consisting of carborundum, alpha alumina, gamma alumina, delta alumina, zirconia, mullite, cordierite, aluminum phosphate, aluminum borate and combinations thereof.

13. The process as defined in claim 10 wherein said catalyst comprises nickel and rhodium dispersed on an aluminum borate-coated cordierite ceramic support.

14. A process for the rejuvenation of an auto exhaust gas conversion catalyst comprising a Group VIII metal dispersed on a refractory oxide support, said catalyst having been previously utilized for the conversion of air pollutants in auto exhaust gases containing lead and phosphorus compounds with resultant deposition thereon of deactivating solids comprising inorganic compounds of lead and phosphorus which process comprises:

a. contacting said catalyst with a sulfating gas for at least about 10 minutes at a temperature between about 200° and about 800°C, said sulfating gas comprising sulfur dioxide as its essential active component;

b. contacting the sulfated catalyst from step (a) with an aqueous ammonium salt solution of at least about 0.1 M concentration at a temperature between about 20°C and the boiling temperature for at least about 10 minutes; and c. recovering said contacting with at least some of said lead and phosphorus deactivating solids removed therefrom, said catalyst being recovered in a substantially more active condition.

15. A process for the rejuvention of an auto exhaust gas conversion catalyst comprising a Group VIII metal dispersed on a refractory oxide support, said catalyst having been previously utilized for the conversion of air pollutants in auto exhaust gases containing lead and phosphorus compounds with resultant deposition thereon of deactivating solids comprising inorganic compounds of lead and phosphorus which process comprises:

a. contacting said catalyst with a sulfating gas for at least about 10 minutes at a temperature between about 200° and about 800°C, said sulfating gas comprising sulfur dioxide as its essential active component;

b. contacting the sulfated catalyst from step (a) with an aqueous ammonium salt solution of at least about 0.1 M concentration at a temperature between about 20°C and boiling for at least about 10 minutes, said ammonium salt being selected from the class consisting of ammonium chloride, ammonium nitrate, ammonium sulfate, ammonium acetate, ammonium citrate and ammonium carbonate, thereby removing at least some of said lead and phosphorus deactivating solids from said catalyst; and c. recovering said catalyst in a substantially more active condition.

16. The process as defined in claim 15 wherein said contacting in step (b) is carried out with an aqueous ammonium acetate solution at a temperature between about 70°C and boiling.

17. The process as defined in claim 16 wherein said contacting in step (a) is carried out at a temperature between about 300°C and about 700°C for at least about 1 hour.

18. The process as defined in claim 16 wherein said Group VIII metal is selected from the class consisting of nickel, platinum, palladium, rhodium and mixtures thereof.

19. The process as defined in claim 18 wherein said refractory oxide support is selected from the class consisting of carborundum, alpha alumina, gamma alumina, delta alumina, zirconia, mullite, cordierite, aluminum phosphate, aluminum borate and combinations thereof.

20. The process as defined in claim 16 wherein said catalyst comprises nickel and rhodium dispersed on an aluminum borate-coated cordierite ceramic support.

21. The process as defined in claim 16 wherein said sulfating gas also comprises free oxygen.

22. The process as defined in claim 21 wherein said contacting in step (a) is carried out at a temperature between about 300°C and about 700°C for at least about 1 hour.

23. The process as defined in claim 21 wherein said Group VIII metal is selected from the class consisting of nickel, platinum, palladium, rhodium and mixtures thereof.

24. The process as defined in claim 21 wherein said catalyst comprises nickel and rhodium dispersed on an aluminum borate-coated cordierite ceramic support.

* * * * *